United States Patent [19]

Hawkins

[11] Patent Number: 5,358,268
[45] Date of Patent: Oct. 25, 1994

[54] MOTOR VEHICLE SIDE STEP

[75] Inventor: Clive A. Hawkins, Chichester, England

[73] Assignee: Isuzu Motors Limited, Tokyo, Japan

[21] Appl. No.: 135,890

[22] Filed: Oct. 13, 1993

[51] Int. Cl.[5] .............................................. B60R 3/02
[52] U.S. Cl. .................................. 280/166; 296/146.9; 182/91
[58] Field of Search .................... 280/164.1, 166, 163; 296/62, 146.9; 182/91, 127

[56] References Cited

U.S. PATENT DOCUMENTS

| | | | |
|---|---|---|---|
| 1,450,474 | 4/1923 | Wilkens | 280/164.1 X |
| 2,438,238 | 3/1948 | Tonkin | 296/146.9 X |
| 2,997,336 | 8/1961 | Huggins et al. | 296/146.9 X |
| 3,572,754 | 3/1971 | Fowler | 280/166 |
| 3,955,827 | 5/1976 | Wonigar | 280/166 |
| 4,275,664 | 6/1981 | Reddy | 280/166 X |
| 4,424,751 | 1/1984 | Blochinger | 280/166 X |
| 4,842,325 | 6/1989 | Irelan | 280/164.1 X |
| 5,085,450 | 2/1992 | DeHart, Sr. | 280/166 |

FOREIGN PATENT DOCUMENTS

| | | | |
|---|---|---|---|
| 0418615 | 3/1991 | European Pat. Off. | 280/166 |
| 1229412 | 11/1966 | Fed. Rep. of Germany | 280/164.1 |
| 654777 | 3/1979 | U.S.S.R. | 182/91 |

*Primary Examiner*—Brian L. Johnson
*Attorney, Agent, or Firm*—Thomas A. Gallagher

[57] ABSTRACT

A side step for a vehicle, particularly a sports utility passenger vehicle is openable and closeable. In a preferred embodiment, the side step automatically opens when the front door of the vehicle is opened. In its open position, a toe kick panel provides a barrier to the side step support and movement mechanisms.

8 Claims, 5 Drawing Sheets

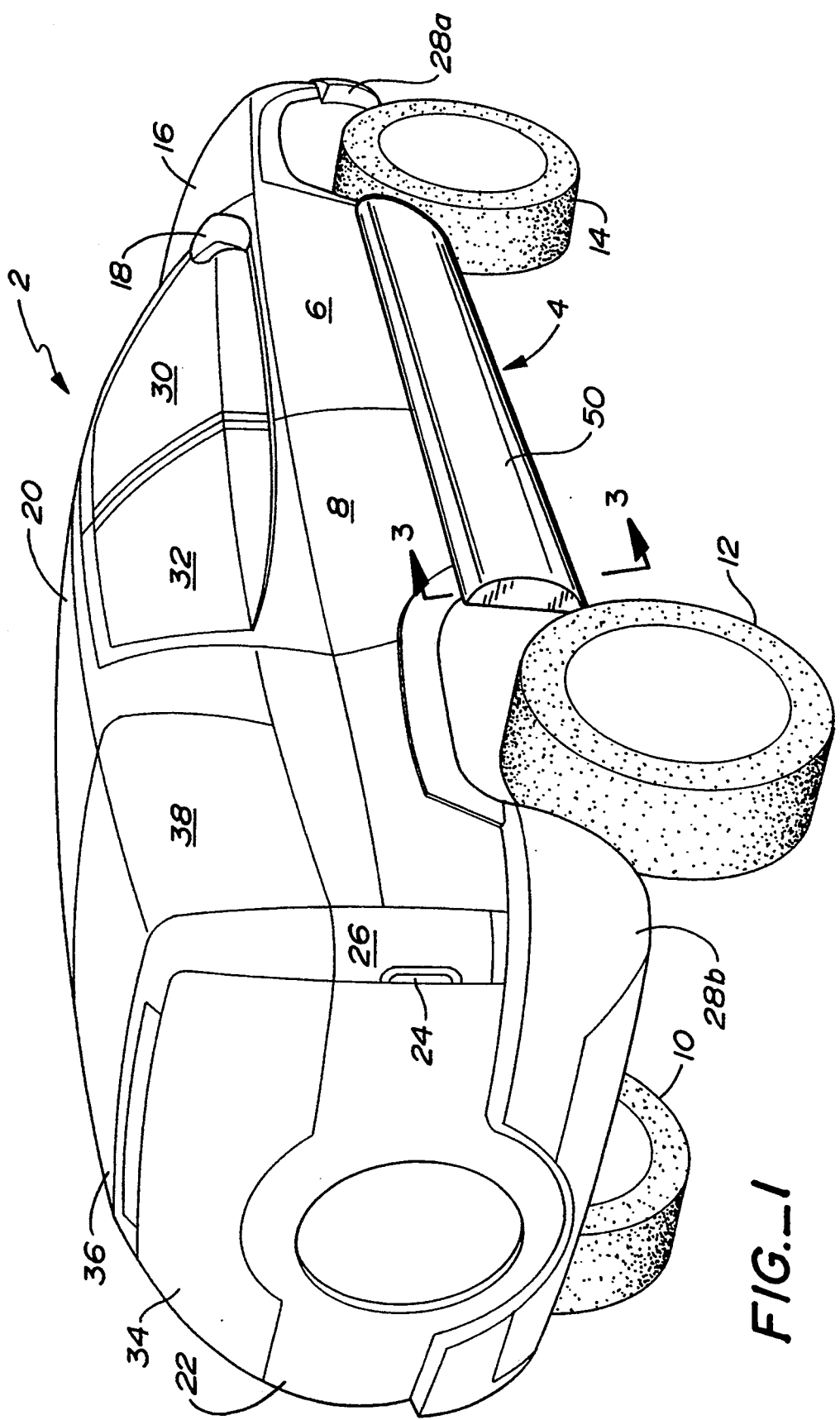
FIG._1

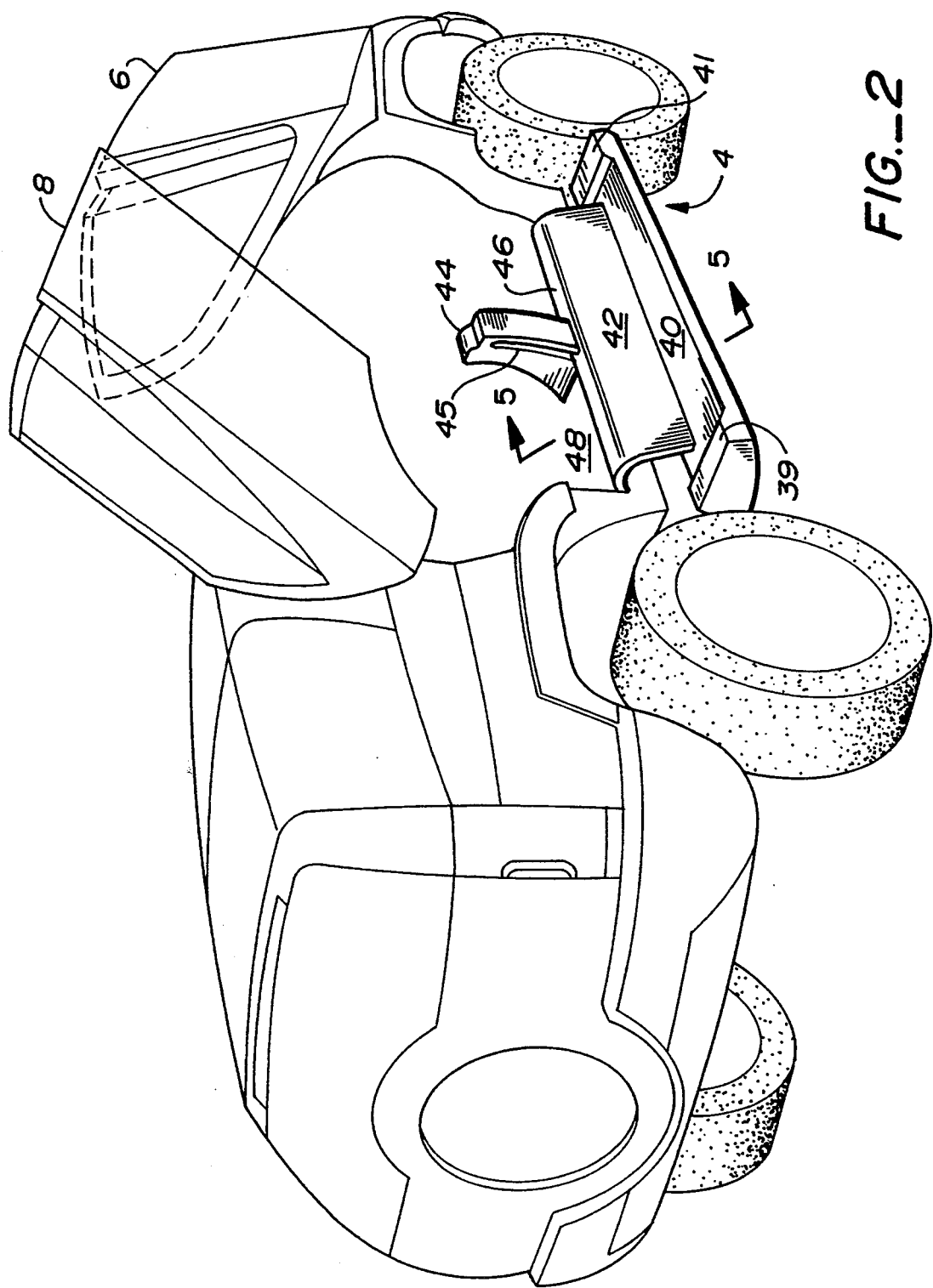
FIG._2

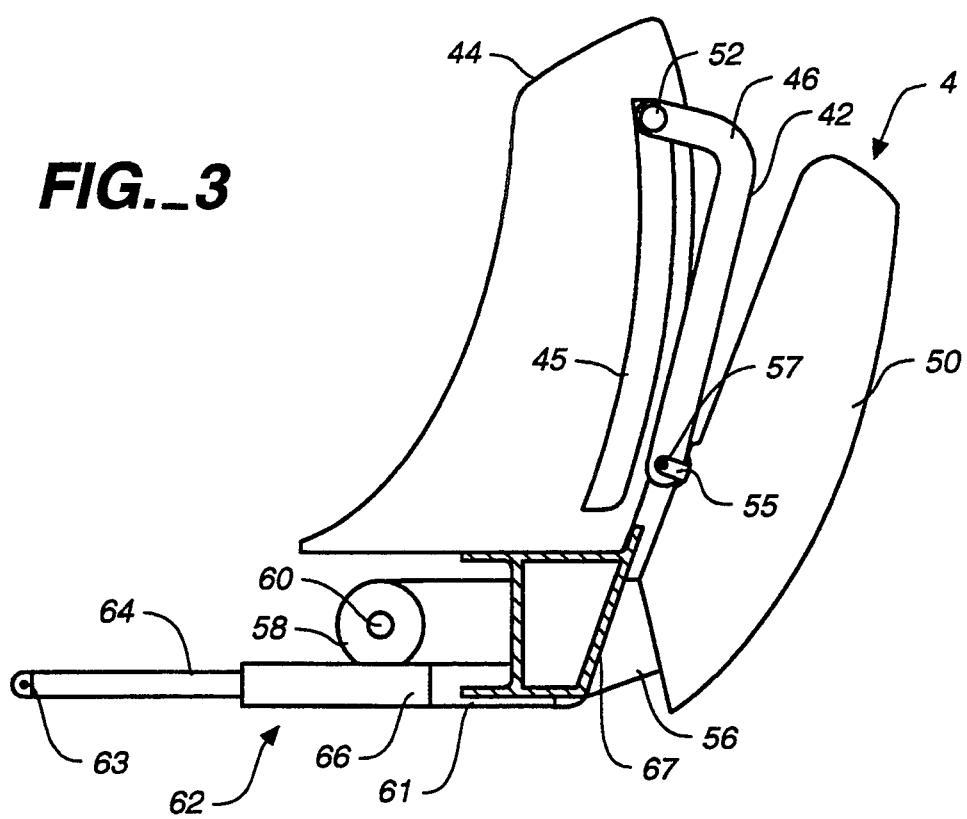
FIG._3
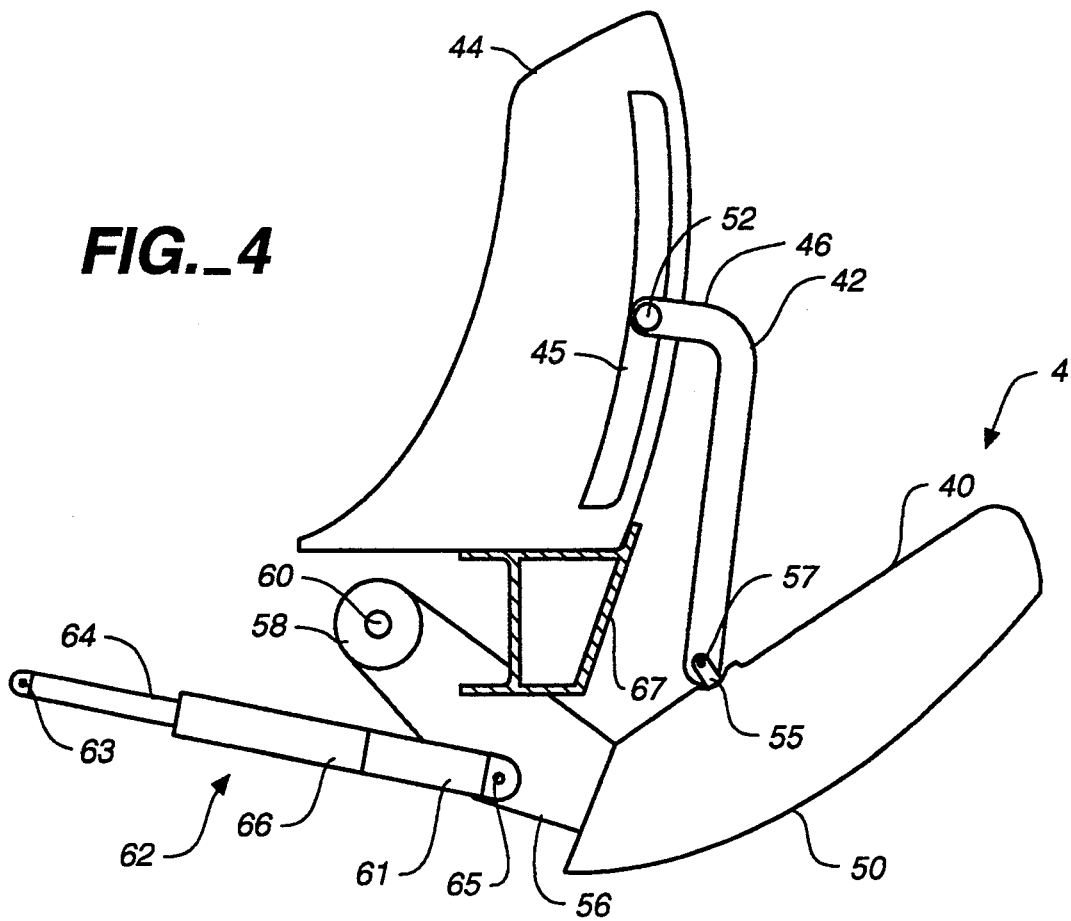
FIG._4

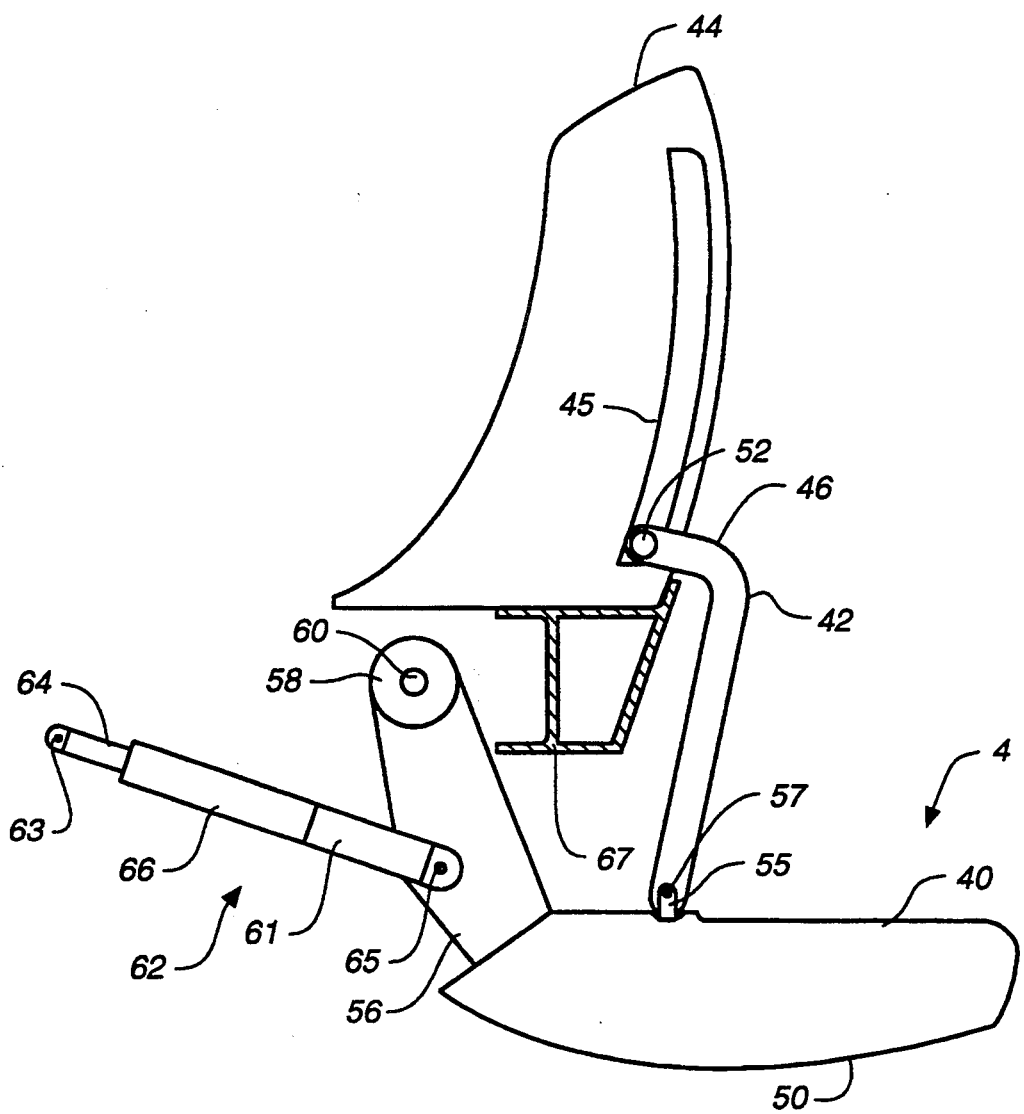
FIG._5

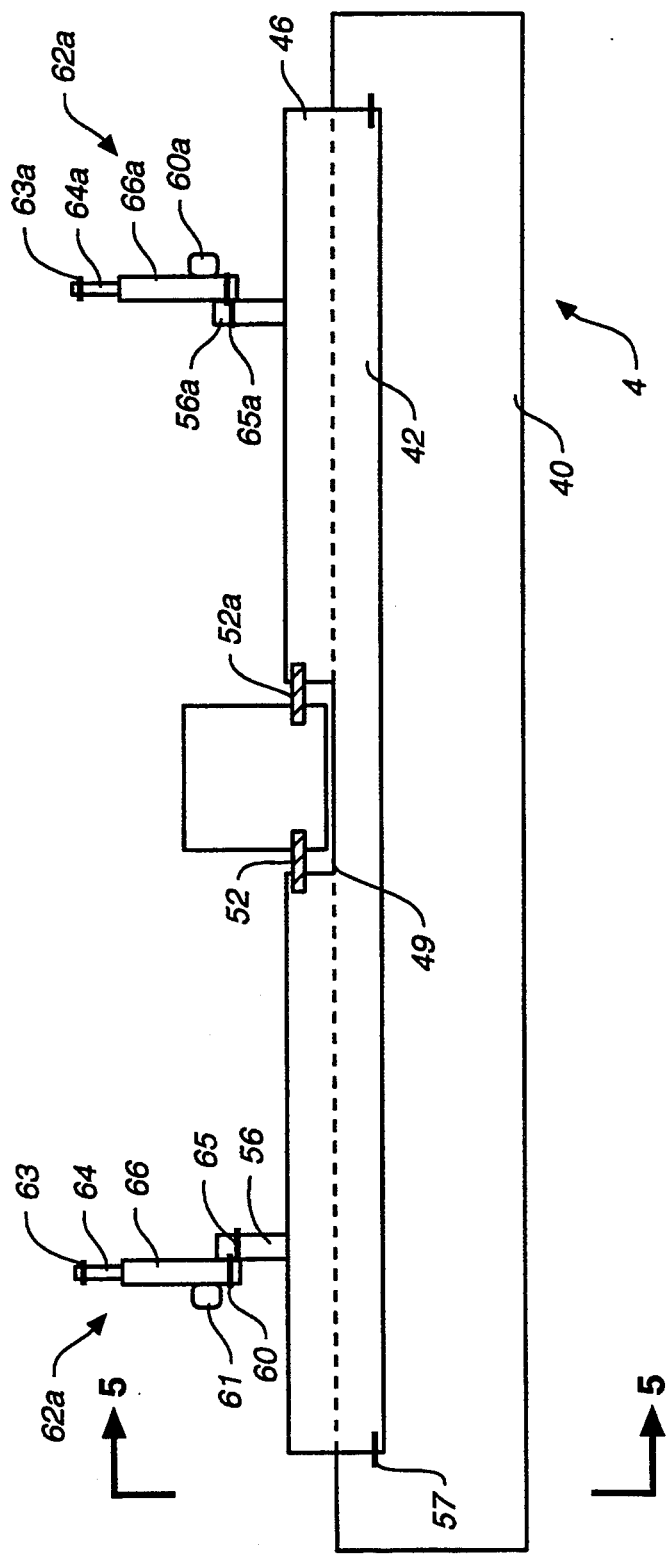
FIG._6

MOTOR VEHICLE SIDE STEP

BACKGROUND OF THE INVENTION

This application relates generally to side steps for motor vehicles. More particularly, the invention relates to an openable and closeable side step. Preferably, the side step automatically opens and closes when the door of the vehicle is opened and closed. Such an arrangement is particularly useful in a sports utility type vehicle in which a person entering the vehicle is required to step a relatively high distance. Because the side step is closed except when it is needed, the aesthetic appearance of the vehicle is not degraded by a side step which is always in view.

SUMMARY OF THE INVENTION

In accordance with the teachings of the present invention, apparatus for a vehicle is provided. A side step assists passengers to ingress and egress a vehicle. The side step is controllably supported and positioned with respect to the vehicle. The side step is positioned in a generally vertical closed position in proximity to the side of the vehicle and in a generally horizontal open position for use by passengers in the ingress and egress of the vehicle. In addition, a toe kick panel is coupled to the side step and the vehicle such that the toe kick panel is hidden when said side step is in its closed position and is in a generally vertical position between the vehicle and the side step when the side step is in its open position. The side step positioning is accomplished by use of at least one motor and preferably two electric motors.

BRIEF DESCRIPTION OF THE DRAWINGS

FIG. 1 shows a perspective right rear side view of a vehicle having an openable and closeable side step in accordance with a preferred embodiment of the invention. In this view, the side step is closed.

FIG. 2 shows a perspective, partially diagrammatic, view, similar to FIG. 1, of a vehicle having an openable and closeable side step in accordance with a preferred embodiment of the invention. In this view, the side step and the front and rear doors are all open.

FIG. 3 is a cross-sectional diagrammatic side view taken generally along section lines 3—3 of FIG. 1, showing the side step in its closed position.

FIG. 4 is a cross-sectional diagrammatic side view similar to FIG. 3, but showing the side step in its partially open condition.

FIG. 5 is a cross-sectional diagrammatic side view taken generally along section lines 5—5 of FIGS. 2 and 6, showing the side step in its fully open condition.

FIG. 6 is a cross-sectional diagrammatic plan view, showing the side step in its fully open condition.

DETAILED DESCRIPTION OF THE PREFERRED EMBODIMENT

Referring now to the drawings, FIG. 1 shows a right rear perspective view of a vehicle 2 having an openable and closeable side step in accordance with a preferred embodiment of the present invention. The vehicle shown is of the type commonly referred to as a sports utility type vehicle. Consequently, the height of vehicle above the road is greater than the height of typical passenger vehicles and such sport utility vehicles often have a side step to assist passengers in entering the vehicle. According to the present invention, the vehicle is provided with an openable and closeable side step.

The side step 4 is shown in its closed position in this view. The vehicle has a right front passenger door 6 and a right rear passenger door 8. The left hand side of the vehicle is substantially a mirror image and also has an openable side step (not shown). Although the invention will be described in connection with the side of the vehicle shown in FIG. 1, it is to be understood that essentially the same arrangement is provided on the other side of the vehicle. The vehicle includes other elements unrelated to the present invention, including wheels and tires 10, 12 and 14, a hood 16, a right side mirror 18, a roof 20, a rear door 22, a right rear brake light lens 24 having a cutout portion 26 for manual access to the rear door opening lever, front and rear bumpers 28a and 28b, and various glass members including side door windows 30 and 32, rear window 34, rear top window 36 and rear side window 38.

In FIG. 2 the side step 4 and the front and rear doors 6 and 8 are shown in their fully open positions. The outer portion of side step 4, visible in FIG. 1, is now facing downward, exposing the now generally horizontal step portion 40. The upward facing face of step portion 40 is preferably patterned, grooved or toughened in some manner to provide a relatively non-slip surface for stepping. The side step 4 is substantially horizontal and extends substantially from near the rearward-most edge of the front tire to the forward-most edge of the rear tire and is approximately at the height of the wheel axes. The end portions 39 and 41 of side step 4, near the front and rear tires, respectively, are raised, to guide the user away from the side step edges and for decorative purposes.

Also exposed in the side step open condition of FIG. 2 is a toe kick panel 42 and a door engaging and locking with the pillar 44. Pillar 44 also has a channel 45 running vertically across its width. A wheel or roller is captured on each side of the pillar channel 45 (the rollers are not shown). Each roller is pivotally connected by a pin (not shown in this view) to the upper portion of the toe kick panel 42, thus providing a top support for the panel and allowing it to move up and down freely along a line defined by the pillar channel 45 as the lower portion of the kick panel is controllably moved along with the side step 4, as will be explained hereinafter. In the open position shown in FIG. 2, the toe kick panel 42 is generally vertical. Panel 42 has an upper lip portion 46 which is curved to wrap over the sill of the vehicle cabin floor 48. The lip portion 46 of toe kick panel 42 has a notch 49 to allow it to fit around the pillar 44. The toe kick panel 42 extends substantially from the forward edge of the front door opening to the rear edge of the rear door opening. The toe kick panel 42 thus protects the vehicle cabin floor sill from dirt and it also provides a visual and protective mechanical barrier to various mechanisms (described hereinafter) behind the kick panel, which mechanisms lower and raise the kick panel and side step. When the side step 4 is in its closed position, the toe kick panel 42 provides additional advantages from the standpoint of the vehicle interior: it protects the vehicle's carpeting and upholstery from dirt on the side step and it prevents dirt on the side step from being seen by passengers in the vehicle.

As is apparent from the view of FIG. 2, the front and rear vehicle doors 6 and 8 are each hinged at an inclined angle so that the doors tilt upward when opened. This permits easier ingress and egress by the vehicle's passengers.

Referring now to FIG. 3, the figure is a cross-sectional diagrammatic side view taken generally along section lines 3—3 of FIG. 1, showing a preferred embodiment of the side step 4 in its closed position. The outer portion 50 of step 2 is the portion which is visible in the view of FIG. 1. The left end of toe kick panel 42 is seen. The previously mentioned notch 49 (notch 49 is best seen in FIG. 6) in lip portion 46 of panel 42 is connected to a pin 52 which connects to a bearing (not shown) in the roller (not shown) which rides inside channel 45. The lower portion of the toe kick panel 42 is attached to the side step 4 at each end of panel 42 by means of short extension tab 55 extending from side step 4 and a pin 57 which allows panel 42 and side step 4 to pivot with respect to each other (see also FIG. 6).

Continuing the description of FIG. 3, the primary support for the side step 4 is provided by two cantilevered support arms, one of which, arm 56, is shown. Arm 56 is attached to a bearing 58 having a central shaft 60 which is attached to the vehicle frame in a suitable manner (not shown). The other cantilevered arm, shown in FIG. 6, also has a bearing with a central shaft attached to the vehicle frame.

Controlled movement of the cantilevered arms and side step 4 is provided by first and second electric motor driven actuators attached to the cantilevered arms. An actuator 62, attached to arm 56 is shown. Actuator 62 is driven by an associated electric motor 61. The second actuator and electric motor (not shown) is configured in the same manner with respect to the other cantilevered arm. The actuators have a bi-directional telescoping-type action: the length of the actuator structure is variable. Each actuator 62 is composed of two main pieces, 64 and 66, which are generally tubular in shape. Portion 64 is controllably drawn in and out of portion 66 under the control of the electric motor 61. The distal end of portion 64 is pivotally connected to the frame of the vehicle by a pin 63 and the distal end of portion 66 is pivotally connected to arm 56 by a pin (shown in FIGS. 4 and 5).

Thus, by driving actuator 62 so as to reduce its length, the arm 56 is rotated downward, causing side step 4 to rotate downward along with its supporting cantilever arm 56. As side step 4 opens under control of the actuators, the toe kick panel 42 also is pulled downward, its rollers traveling downward in the pillar channel 45. In order to provide sufficient control and stability for the side step 4, it is preferred that two drive actuators are provided, although one strong, centrally located actuator and drive motor may be sufficient. So that the two may be synchronized in their operation, it is preferred that the actuators are driven by electric motors.

A conventional rocker member 67 runs along a substantial portion of the side of the vehicle, including under the pillar 44.

FIG. 4 shows the side step 4 approximately half open. The lip portion 46 of the toe kick panel 42 is about half way down pillar 44 and the smaller portion 64 of actuator 62 is about half way retracted into the larger portion 66. This view exposes pin 65 which pivotally connects actuator 62 to cantilevered arm 56.

FIG. 5 is a cross-sectional diagrammatic side view taken generally along section lines 5—5 of FIGS. 2 and 6, showing the side step in its fully open condition. The lip portion 46 of the toe kick panel 42 is all the way down pillar 44 and the smaller portion 64 of actuator 62 is substantially retracted into the larger portion 66. In this position, the side kick panel 42, because it cannot move down any more, provides some minor additional structural support to the side step 4.

FIG. 6 is a diagrammatic plan view showing the side step in its fully open condition. This view shows certain elements mentioned in the above descriptions, but not seen in the other views. These include pin 52a which acts in the manner of pin 52 and which connects panel 42 to pillar 44 on the other side of the notch 49. In addition, the second actuator 62a and electric drive motor 61a are seen. The actuator 62a has corresponding portions 64a and 66a and is connected to the vehicle by pin 63a and to the corresponding cantilevered arm 56a by pin 65a. Arm 56a rotates on shaft 60a.

The materials used for the various members, including the side step and toe kick panel are not critical, taking into account the requirements to provide sufficient weight bearing capacity for the side step. The weight bearing members are preferably steel or other material reinforced with steel. The toe kick panel may be formed from a lighter weight material such as aluminum or a plastic composite.

In a preferred embodiment of the invention, operation takes place in the following sequence. The vehicle's front door is unlatched by the vehicle user, actuating electrical motor drive circuitry (not shown) which drives the electric motors briefly in the direction to cause the side step to open a short distance, sufficient to allow the front door to clear the top of the side step as the door is initially swung upward. As the front door is continued to be swung upward, the electric motor drive circuitry causes the motors to move the side step to its fully open position. If desired, the rear door may also be opened once the side panel has initially opened a short distance. If opened, the rear door should be closed before the front door is closed. Then, as the front door is swung downward toward its closed position, the electrical motor drive circuitry causes the motors to move the side panel to close almost all the way, but providing sufficient room for clearance until the door is fully closed and latched, at which time the electrical motor drive circuitry causes the motors to move the side step to its fully closed position. Sensors (not shown) indicating the front door position provide suitable signals to the electrical motor drive circuitry. Alternatively, the side panel operation may be independent of the vehicle door opening, although it is preferred, for convenience of vehicle users, that the side panel opening and closing occur automatically when the front door is opened and closed.

Although the invention has been disclosed in terms of the preferred embodiment disclosed herein, those skilled in the art will appreciate numerous modifications and enhancements which can be made without departing from the true spirit of the invention. All such modifications and enhancements are intended to be included within the scope of the following claims.

I claim:

1. Apparatus for a vehicle, comprising
a movable side step, a movable toe kick panel coupled to said side step, said side step comprising an elongated member having a stepping side and a non-stepping side, the non-stepping side of said side step forming a portion of the generally vertical outer surface of the vehicle when the side step is in a closed position, and at the same time the toe kick panel being located generally vertically between the stepping side of said side step and said vehicle, said side step being mounted for movement from the closed position to an open position extending outboard of the vehicle in which the stepping side of said side step is substantially horizontal and below the level of the vehicle floor for assisting passengers to ingress and egress said vehicle, said side step in moving to the open position simultaneously outward and downward relative of the vehicle floor, said side step pulling the coupled side toe kick panel downward as the side step rotates while maintaining the side kick panel generally vertical, said toe kick panel extending from the vehicle floor to the stepping side of said side step when the side step is in the open position, means mounted to said vehicle for pivotally supporting said side step, and means mounted to said vehicle for guiding said toe kick panel generally vertically as the toe kick panel is pulled downward by said side step.

2. Apparatus for a vehicle according to claim 1, wherein said toe kick panel has an upper lip portion which is curved to wrap over the sill of the vehicle cabin floor when said side step is in the open position.

3. Apparatus for a vehicle according to claim 1, wherein said means for pivotally supporting said side step includes pivot means and a plurality of support arms each pivotally coupled to said pivot means at one end thereof and connected to said side step at the other end thereof, said pivot means disposed beneath the vehicle and inward of the vehicle side, said support arms having a length commensurate with the distance between said pivot means and the vehicle side, and the support arms and side step forming a shallow angle such that the side step is substantially flush with the vehicle when the side step is in the closed position and is outboard of the vehicle and below the level of the vehicle floor when the side step is in the open position.

4. Apparatus according to claim 3 further comprising means coupled to at least one of said support arms for controlling the position of said movable side step.

5. Apparatus for a vehicle according to claim 1, wherein said means for guiding said toe kick panel includes a vertical pillar having a channel through a vertical length and means for translatably coupling the top of said toe kick panel to said channel.

6. Apparatus for a vehicle according to claim 5 wherein said vehicle has doors and wherein said vertical pillar also engages and locks a vehicle door.

7. Apparatus for a vehicle according to claim 5 wherein said vehicle has four doors, two on each side of the vehicle, and wherein said vertical pillar is located between first and second side doors and wherein said vertical pillar also engages and locks the two vehicle side doors.

8. Apparatus according to claim 1 further comprising means for controlling the position of said movable side step.

* * * * *